2 Sheets-Sheet 1.

G. A. Reiniger,

Cigar Machine.

No. 3,011.

Reissued June 30, 1868.

Witnesses.

E. L. Topliff

Thos Lucas

Inventor.

G. A. Reiniger per Munn & Co

Attorneys

2 Sheets-Sheet 2.

G. A. Reiniger.

Cigar Machine.

No. 3,011. Reissued June 30, 1868.

Witnesses.

E. L. Topleff

Chas Duell

Inventor.

C. A. Reiniger per Munn & Co

Attorneys

UNITED STATES PATENT OFFICE.

GEORGE MOEBS, OF DETROIT, MICHIGAN, ASSIGNEE, BY MESNE ASSIGNMENTS, OF G. ALBERT REINIGER.

IMPROVEMENT IN CIGAR-MACHINES.

Specification forming part of Letters Patent No. 55,217, dated May 29, 1866; Reissue No. 3,011, dated June 30, 1868.

*To all whom it may concern:*

Be it known that G. ALBERT REINIGER, of Stuttgart, in the Kingdom of Würtemberg, has invented a new and Improved Machine for Putting on the Wrappers of Cigars; and I do hereby declare that the following is a full, clear, and exact description of the same, reference being had to the accompanying drawings, forming part of this specification, in which—

Figure 1:
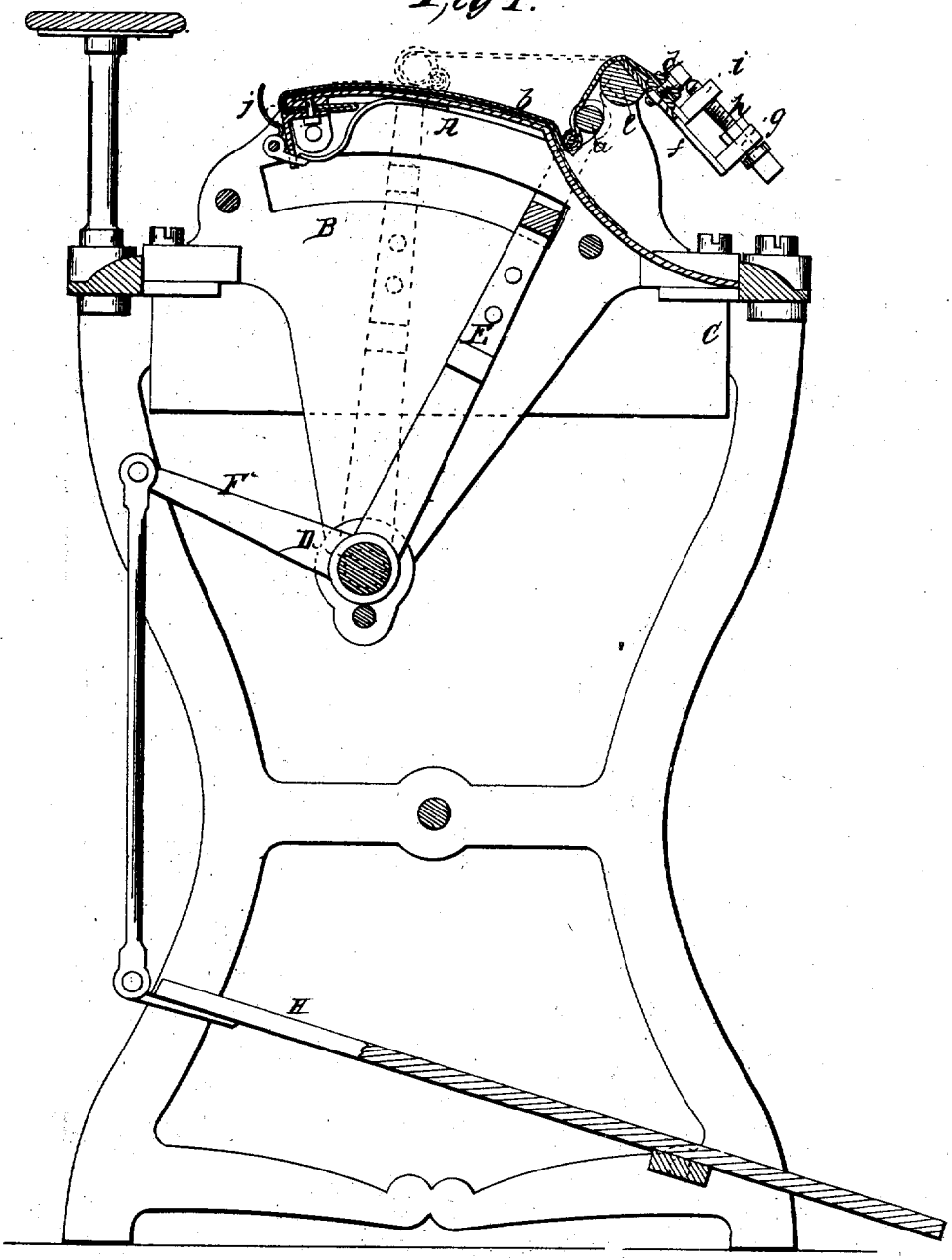
Figure 2:
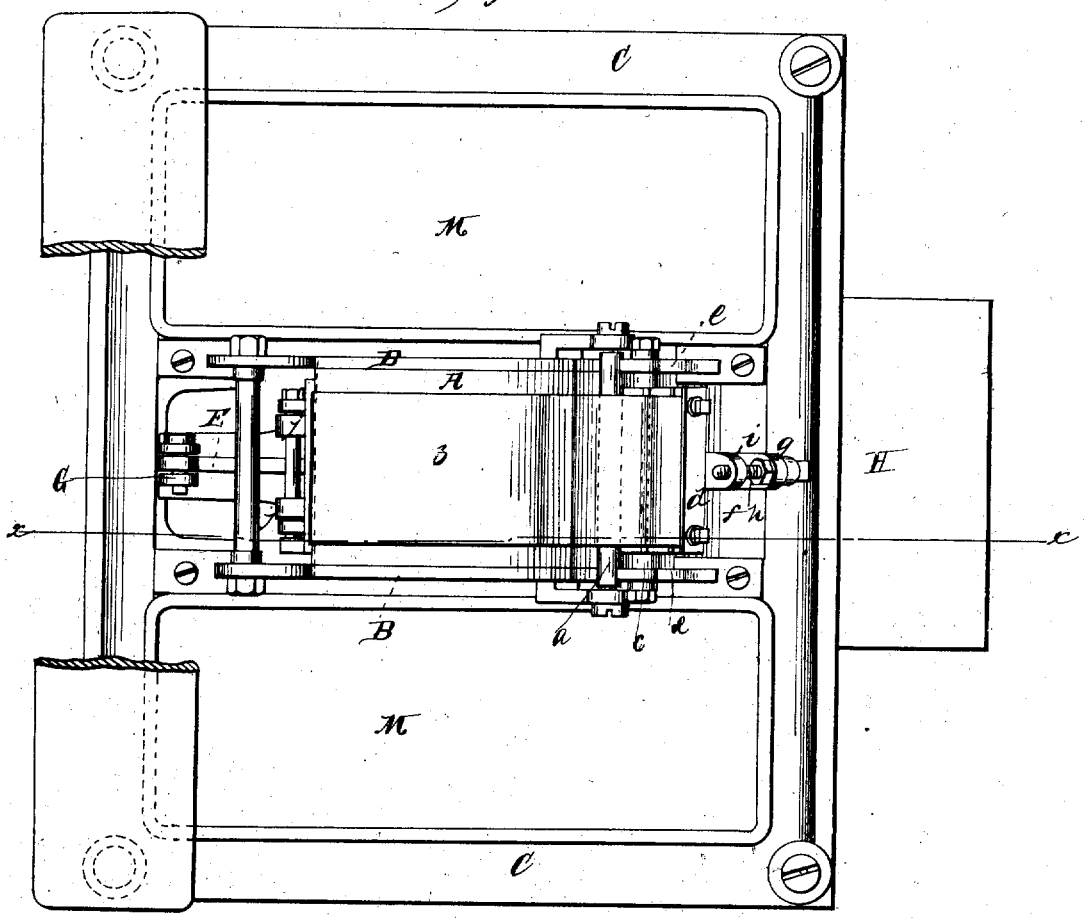

Figure 1 represents a longitudinal vertical section in the plane indicated by the line *x x*, Fig. 2; and Fig. 2 is a plan or top view.

Similar letters of reference indicate like parts.

The present invention consists of certain improvements in the class of machines on which a patent was granted to the said G. Albert Reiniger, October 29, 1861. In the new machine suitable troughs are arranged on the sides of the fixed table—one to hold the fillers and the other the wrappers—and a separate compartment may be made in one of these boxes to receive the cigars after they are wrapped. The apron, which in the original machine was made adjustable by a ratchet-wheel and pawl, is in the present machine adjusted by a sliding screw-clamp, and spring-hooks are provided to receive the cigar as it is discharged from the apron.

A represents a curved or segmental table, made of cast-iron or any other suitable material and supported by arms B, which are firmly secured to the main frame C, and which extend down far enough to form the bearings for a rock-shaft, D, the center of which coincides with the center of the segmental table A. From the rock-shaft D extends a radius-bar, E, the forked end of which forms the bearings for a roller, *a*, which, in combination with the flexible apron *b*, forms the principal working part of the machine. The apron, which is made of strong canvas or other suitable material, is firmly clamped to one end of the curved table A, the other end being drawn over a guide-bar, *c*, and secured in an adjustable screw-clamp, *d*. The guide-bar *c* is fastened between two standards, *e*, which rise from the ends of the arms B, supporting the curved table A, and from it extends, inclining downward, a fixed apron, *f*, provided with a lug, *g*, which is bored out to receive the regulating-screw *h*. This screw is tapped in a lug, *i*, rising from the screw-clamp *d*, so that by turning it in one direction the flexible apron *b* is shortened, and by turning it in the opposite direction said apron is lengthened. From the rock-shaft D extends an arm, F, which connects by a shackle-bar, G, with a treadle, H, so that by stepping on said treadle the roller *a* can be made to sweep over the curved surface of the table A. This surface is provided with a depression, *k*, at one end deep enough to receive the filler, and at its opposite end a pair of spring-hooks, *j*, are attached, intended to receive the cigar after the wrapper has been applied.

The operation is as follows: The roller *a* is brought over the depression *k*, and the flexible apron is forced down into said depression, so that a loop or bight is formed in the apron capable of receiving the filler or body of the cigar to which the wrapper is to be applied. A filler is placed in this loop, a wrapper is spread upon the table A, and by stepping on the treadle H the roller *a* is made to sweep over the table. By the action of the roller on the apron a rolling motion is imparted to the filler, and the wrapper is wound round it as it would be if rolled by hand. The relative position of the apron, roller, and filler during this operation is shown in red outlines in Fig. 1. When the roller has arrived at about the middle of the table A, a small strip of paper may be applied to cover the cigar, if desired. By the action of the roller the covered cigar is forced into the springs *j*, which open to receive the same, and which are so arranged that they will readily accommodate themselves to cigars of different sizes.

M M are the boxes or troughs on each side of the machine, for holding the fillers and wrappers. By a transverse partition across either of these a compartment may also be formed for the cigars after the wrappers are put on.

The table, flexible apron, and roller are not claimed, as the same are already patented to the said G. Albert Reiniger in Letters Patent No. 33,604, dated October 29, 1861; but

What is claimed herein as the invention of G. ALBERT REINIGER is—

1. The table A, provided with the troughs M, in connection with the cigar-machine, substantially as and for the purpose described.

2. The spring-hooks *j*, in combination with the table A, apron *b*, and roller *a*, constructed and operating substantially as and for the purpose specified.

GEORGE MOEBS.

Witnesses:
SAML. F. FISHER,
MORITZ B. PHILIPP.